UNITED STATES PATENT OFFICE.

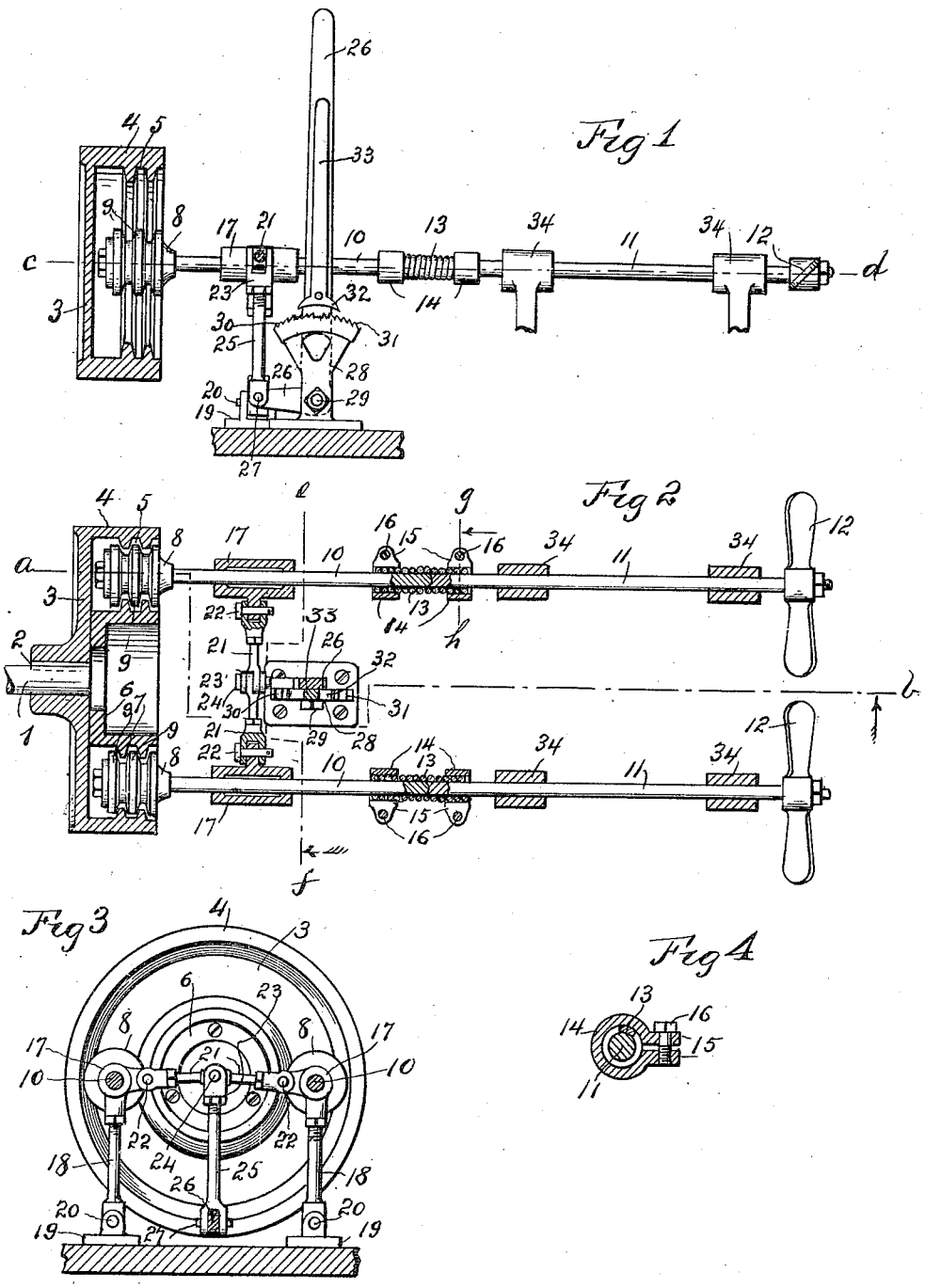

THEODOR RICHARD RYSZKA, OF KANSAS CITY, KANSAS.

POWER-TRANSMISSION MECHANISM.

994,874.

Specification of Letters Patent. Patented June 13, 1911.

Application filed June 20, 1910. Serial No. 567,883.

*To all whom it may concern:*

Be it known that I, THEODOR RICHARD RYSZKA, a citizen of Austria, residing in Kansas City, in the county of Wyandotte and State of Kansas, have invented certain new and useful Improvements in Power-Transmission Mechanism, of which the following is a specification.

My invention relates to improvements in power transmission mechanism.

The object of my invention is to provide a novel form of power transmitting mechanism particularly adapted for rotating the propellers of motor boats.

The novel features of my invention are hereinafter fully described and claimed.

In the accompanying drawings which illustrate the preferred form of my invention, Figure 1 is a vertical sectional view on the broken dotted line $a$—$b$ of Fig. 2. Fig. 2 is a horizontal sectional view taken on the plane of dotted line $c$—$d$ of Fig. 1. Fig. 3 is a cross section on the broken dotted line $e$—$f$ of Fig. 2. Fig. 4 is a cross section on the dotted line $g$—$h$ of Fig. 2.

Similar reference characters denote similar parts.

1 denotes a horizontal driving shaft which is rotated by an engine of any desired construction and not shown. Rigidly secured to the shaft 1, as by a key 2, is a friction wheel 3 having an annular concentric flange 4 the inner surface of which is preferably provided with one or more annular peripheral grooves 5. Secured rigidly to and concentric and rotatable with the wheel 3 is a smaller friction wheel 6 the periphery of which is also preferably provided with one or more annular grooves 7, which are disposed so as to register with the grooves 5. Two intermediate friction wheels 8 are mounted at opposite sides of the friction wheel 6 between said wheel and the flange 4. Said wheels 8 are each preferably provided with one or more annular peripheral flanges 9 adapted to enter the grooves 5 and 7 so as to have alternate driving contact with the wheels 3 and 6.

Two flexible rotary shafts are provided, each comprising two members 10 and 11, preferably cylindrical in form and horizontally disposed. The intermediate friction wheels 8 are respectively secured to and rotatable with the members 10. The members 11 have respectively secured to them and rotatable therewith, propellers 12 of any suitable type, and having their blades disposed so as to exert thrust in the same direction. On each set of members 10 and 11 is mounted a coil spring 13 which encircles said members and has its ends respectively secured to said members. Any suitable means may be employed for securing the ends of the spring to the members 10 and 11. In the drawings I have illustrated a securing means comprising two transversely divided clamping rings 14 embracing the ends respectively of the spring 13 and the members 10 and 11. Each clamping ring is provided with two laterally extending ears 15 provided with transverse holes, one of which is screw threaded, in which is mounted a bolt 16 by which the ears are drawn toward each other to cause the ring to clamp the spring 13 to the member on which the ring is mounted. The member 10 is provided with a convex end fitted in a similarly curved concavity provided in the adjacent end of the member 11. The spring 13 serves to transmit rotation from the member 10 to the member 11, and also serves to hold the members together and in axial alinement with each other. When the members 10 and 11 are in axial alinement with each other the friction wheels 8 are disposed out of contact with the wheels 3 and 6.

To alternately swing the members 10 laterally in opposite directions, so as to bring the wheels 8 alternately into driving engagement with the wheels 3 and 6 I preferably provide the following described mechanism. 17 denotes two bearings comprising blocks of any desired form or material having longitudinal horizontal holes in which are rotatably mounted respectively the members 10. 18 denotes two vertical bars the upper ends of which are secured respectively to the bearings 17, and the lower ends of which are pivoted to supporting blocks 19 by two bolts 20 which are parallel with the members 11. For simultaneously moving the bearings 17 in opposite directions any suitable means may be used. For this purpose I show a toggle joint mechanism comprising two transverse bars 21 the outer ends of which are pivoted to the bearings 17 respectively by bolts 22 which are parallel with the bolts 20. The inner ends of the bars 21 are pivoted to a yoke 23 by a bolt 24 which is parallel with the bolts 22. To the yoke 23 is secured the upper end of a vertical bar 25. For operating the toggle joint mechanism just described, the lower end of the bar 25 is preferably secured to one arm of a bell crank lever 26 by a horizontal bolt 27 disposed at right angles to the bolts 22. The lever 26 is pivoted to a suitable vertical support 28 by a bolt 29 disposed parallel with the bolt 27. The upper end of the support 28 is in the form of the segment of a circle, the upper curved side of which is provided at opposite sides of the center with two oppositely disposed sets of ratchet teeth 30 and 31. Pivoted to the lever 26 above the support 28 is a pawl 32 opposite ends of which are adapted respectively to engage the teeth of the two sets 30 and 31 for the purpose of holding the lever 26 in the positions to which it may be swung. For operating the pawl readily it is preferably provided with a handle 33.

34 denotes stationary bearings in which are rotatably mounted the members 11.

In operating my invention, the parts being in the positions shown in the drawings, the wheels 8 being in the neutral position, just out of contact with either of the wheels 4 and 6, and with the bars 21 inclining upwardly toward the pin 24, when it is desired to drive the propellers 12 in one direction, the lever 26 is swung, for example, to the left as viewed in Figs. 1 and 2, the lever 33 having previously been swung to the right to engage the pawl 32 with the teeth 31, the pawl 32 will slip over the teeth 31 and the members 10 will be swung apart through the intermediacy of the toggle joint mechanism hereinbefore described operating upon the bearings 17. The friction wheels 8 will thus be forced into driving engagement with the flange 4 and the flexible shafts and propellers 12 will be rotated in one direction, this direction depending upon the direction of rotation of the wheel 3, and the springs 13 transmitting rotation from the members 10 to the members 11. The pawl 32 will engage the teeth 31 and hold the lever 26 in the position to which it has been moved. To reverse the direction of rotation of the flexible shafts and propellers 12, the pawl 32 is released by swinging the lever 33 to the left so as to engage the pawl with teeth 30, and the lever 26 is swung in the opposite direction to which it was first swung, that is, to the right. The toggle joint mechanism will be operated to move the bearings 17 toward each other, thereby laterally moving the members 10 to positions in which the friction wheels 8 will have driving engagement with the wheel 6. The wheels 8 will thus be rotated in a direction opposite to the direction in which they rotated when the lever 26 was first swung, and the driving shafts and propellers will be also rotated in the opposite direction. The pawl 32 by engaging with the teeth 30 will hold the lever 26 in the position to which it was last adjusted.

By having the coil springs 13 provided with close windings which snugly fit the members 10 and 11, and by having the members 11 provided with the concavities in which are pivotally mounted the convex ends of the members 10, flexible shafts are provided which are strong, readily flexed, and are not easily disconnected at their joints by any work which may be required of them.

I do not limit my invention to the structure shown and described, as many modifications may be made, within the scope of the appended claims, without departing from the spirit of my invention.

Having thus described my invention, what I claim and desire to secure by Letters Patent, is:—

1. In power transmission mechanism, a friction wheel having an annular concentric flange, a smaller friction wheel concentric and rotatable with the other wheel, two laterally flexible rotary shafts, two intermediate friction wheels respectively secured to and rotatable with said shafts and disposed at diametrically opposite sides of the smaller friction wheel between said wheel and said flange, and means for simultaneously laterally shifting said shafts in opposite directions, whereby both intermediate wheels may alternately be brought into driving contact with the other two wheels.

2. In power transmission mechanism, a friction wheel having an annular concentric flange, a smaller friction wheel concentric and rotatable with the other wheel, two laterally flexible rotary shafts, two intermediate friction wheels respectively secured to and rotatable with said shafts and disposed at opposite sides of the smaller friction wheel between said wheel and said flange, means for simultaneously laterally moving said shafts in opposite directions to two positions each, whereby both intermediate wheels may alternately be brought into driving contact with the smaller wheel and said flange, and releasable means for holding said shafts in said two positions.

3. In power transmission mechanism, two laterally movable shafts, two bearings in which said shafts are respectively rotatably mounted, two laterally swinging supports respectively supporting said bearings, a toggle joint mechanism connecting said two bearings, and a lever for operating said toggle joint mechanism to move the shafts toward and from each other.

4. In power transmission mechanism, two laterally movable shafts, each comprising two members disposed end to end, and a coil spring encircling and having its ends respectively secured to said members, two bearings in which two members of said shafts are respectively rotatably mounted, two laterally swinging supports respectively supporting said bearings, a toggle joint mechanism connecting said bearings, a lever for operating said toggle joint mechanism, and releasable means for holding the lever in positions to which it may be swung.

5. In power transmission mechanism, two laterally movable shafts, each comprising two members disposed end to end, and a coil spring encircling and having its ends respectively secured to said members, two bearings in which two members of said shafts are respectively rotatably mounted, and means for simultaneously moving said bearings in opposite directions.

6. In power transmission mechanism, two laterally movable shafts, each comprising two members disposed end to end, and a coil spring encircling and having its ends respectively secured to said members, two bearings in which two members of said shafts are respectively rotatably mounted, means by which each of said bearings may be alternately moved in opposite directions, and releasable means for holding said bearings in the positions to which they are moved.

In testimony whereof I have signed my name to this specification in presence of two subscribing witnesses.

THEODOR RICHARD RYSZKA.

Witnesses:
E. B. House,
Chester Thomas.

---

Copies of this patent may be obtained for five cents each, by addressing the "Commissioner of Patents, Washington, D. C."